United States Patent
Uchiyama et al.

(10) Patent No.: US 10,596,980 B2
(45) Date of Patent: Mar. 24, 2020

(54) BRACKET FOR ON-VEHICLE CAMERA

(71) Applicant: FALTEC Co., Ltd., Kawasaki-shi, Kanagawa-ken (JP)

(72) Inventors: Kenichi Uchiyama, Kanagawa-ken (JP); Masanori Shiratsuchi, Kanagawa-ken (JP)

(73) Assignee: FALTEC Co., Ltd., Kawasaki-shi (JP)

( * ) Notice: Subject to any disclaimer, the term of this patent is extended or adjusted under 35 U.S.C. 154(b) by 0 days.

(21) Appl. No.: 15/937,032

(22) Filed: Mar. 27, 2018

(65) Prior Publication Data

US 2018/0281696 A1    Oct. 4, 2018

(30) Foreign Application Priority Data

Mar. 29, 2017 (JP) .................... 2017-064594

(51) Int. Cl.
*B60R 11/04* (2006.01)
*B60R 1/00* (2006.01)
*B60R 11/00* (2006.01)

(52) U.S. Cl.
CPC ............. *B60R 11/04* (2013.01); *B60R 1/00* (2013.01); *B60R 2011/004* (2013.01); *B60R 2011/0052* (2013.01); *B60R 2300/40* (2013.01)

(58) Field of Classification Search
USPC .......... 248/909, 200, 226.11, 309.1; 224/545, 224/555, 547, 557
See application file for complete search history.

(56) References Cited

U.S. PATENT DOCUMENTS 2,439,091 A * 4/1948 Keating ................. H02G 3/123
248/27.1
2,916,159 A * 12/1959 O'Neill .................... F16B 2/245
206/820
5,615,850 A * 4/1997 Cloninger ................. F16L 3/22
211/26

FOREIGN PATENT DOCUMENTS

| JP | 59-230844 A | 12/1984 |
| JP | 2010-006105 A | 1/2010 |
| JP | 2012-071734 A | 4/2012 |
| JP | 2016-121927 A | 7/2016 |

* cited by examiner

*Primary Examiner* — Alfred J Wujciak
(74) *Attorney, Agent, or Firm* — Sughrue Mion, PLLC

(57) ABSTRACT

A bracket for an on-vehicle camera includes: a camera fixing portion to which the on-vehicle camera is fixed; at least one vehicle-mount fixing portion provided integrally with the camera fixing portion and configured to be fixed to a vehicle body; and at least one weak portion arranged at a position at which the camera fixing portion is separable from the at least one vehicle-mount fixing portion by breakage of the at least one weak portion, the at least one weak portion being breakable more easily than another part of the bracket.

8 Claims, 11 Drawing Sheets

BRACKET FOR ON-VEHICLE CAMERA

CROSS REFERENCE TO RELATED APPLICATION

This application is based upon and claims the benefit of priority from the prior Japanese Patent Application No. 2017-064594, filed on Mar. 29, 2017, the entire contents of which are incorporated herein by reference.

BACKGROUND

1. Technical Field

The disclosure relates to a bracket for an on-vehicle camera.

2. Related Art

As part of a vehicle driving assistance system, driving assistance is provided by using an image around the vehicle captured with an on-vehicle camera and displayed in front of the driving sheet. The on-vehicle camera is fixed to the vehicle body via a bracket.

Japanese Patent Application Publication No. S59-230844 proposes a bracket for an on-vehicle camera which is an L-shaped plate and has a camera fixing portion and a vehicle-mount fixing portion. An on-vehicle camera is fixed to the camera fixing portion using a screw. The vehicle-mount fixing portion is fixed to the vehicle body by being inserted into a gap at a window glass housing. In this way, an on-vehicle camera is often installed, being exposed outside the vehicle body. Accordingly, an on-vehicle camera is likely to receive external force by factors such as hitting other members.

SUMMARY

When a hitting object hits the on-vehicle camera, the bracket for an on-vehicle camera described above may allow damage in some cases to the hitting object or the portion of the vehicle body (such as window glass) where the on-vehicle camera is fixed.

On the matter of hitting against an on-vehicle camera, it is considered to prioritize protection of the hitting object and the portion (such as window glass) where the on-vehicle camera is fixed.

The disclosure is directed to a bracket for an on-vehicle camera which is capable of protecting both a hitting object and a portion of a vehicle body where the on-vehicle camera is fixed.

A bracket for an on-vehicle camera in accordance with some embodiments includes: a camera fixing portion to which the on-vehicle camera is fixed; at least one vehicle-mount fixing portion provided integrally with the camera fixing portion and configured to be fixed to a vehicle body; and at least one weak portion arranged at a position at which the camera fixing portion is separable from the at least one vehicle-mount fixing portion by breakage of the at least one weak portion, the at least one weak portion being breakable more easily than another part of the bracket.

According to the above configuration, when a hitting object hits an on-vehicle camera and an external force is exerted on the on-vehicle camera, the at least one weak portion is broken, and the on-vehicle camera comes off the vehicle body side. Thus, there is no possibility of giving a major damage to the hitting object and the portion of the vehicle body where the on-vehicle camera is fixed, and it is possible to protect both the hitting object and the portion of the vehicle body where the on-vehicle camera is fixed.

DETAILED DESCRIPTION

Figure 1A:
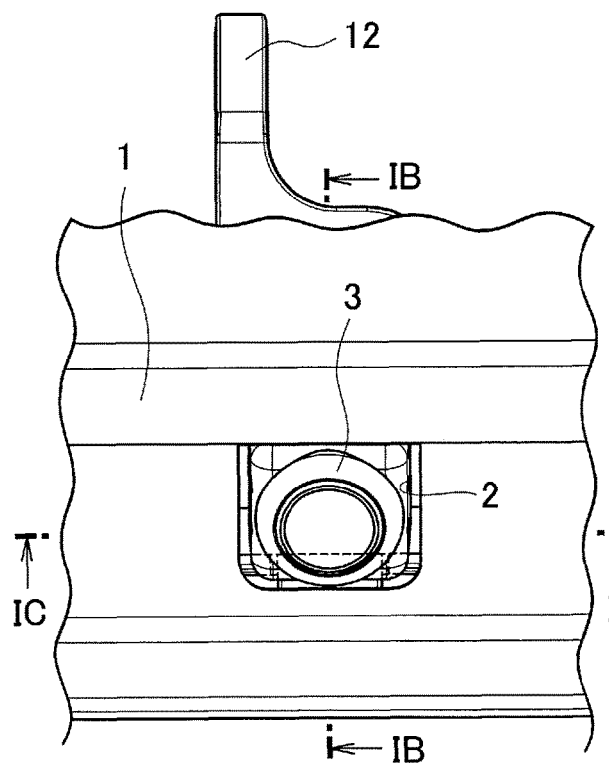
FIG. 1A shows a first embodiment of the present invention and is a perspective view illustrating a state where an on-vehicle camera is installed.
Figure 1B:
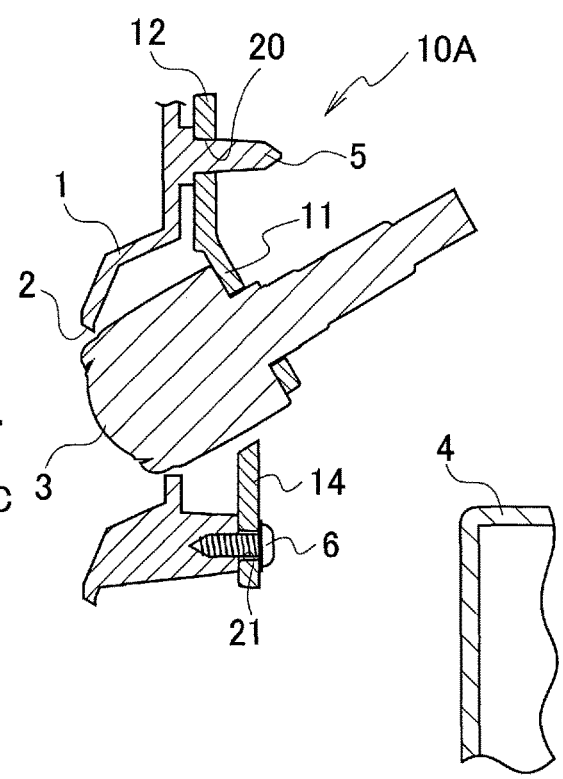
FIG. 1B is a cross-sectional view taken along line IB-IB in FIG. 1A.
Figure 1C:
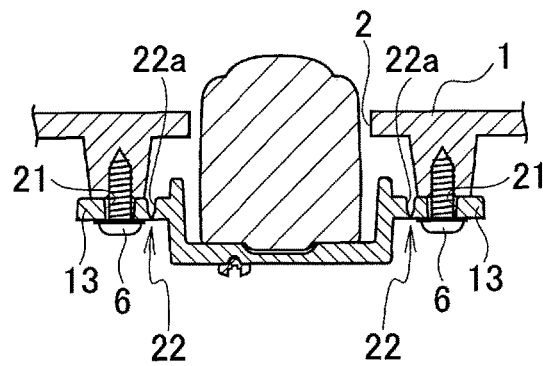
FIG. 1C is a cross-sectional view taken along line IC-IC in FIG. 1A.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Hereinafter, embodiments of the present invention will be described based on the drawings.

FIGS. 1A to 6 illustrate a first embodiment of the present invention. As illustrated in FIGS. 1A to 1C, a front grille 1 of a vehicle has a camera installation hole 2. An on-vehicle camera 3 is fixed via a bracket 10A so as to be seen through the camera installation hole 2. At a position which is in the vicinity backward of the position in the vehicle front-rear direction where the on-vehicle camera 3 is installed and is lower than the installation position of the on-vehicle camera 3, is disposed a beam (reinforcement) 4 which is a vehicle body structure (structural member) having high rigidity. Note that the vehicle body structure is not limited to a beam.

Figure 2:
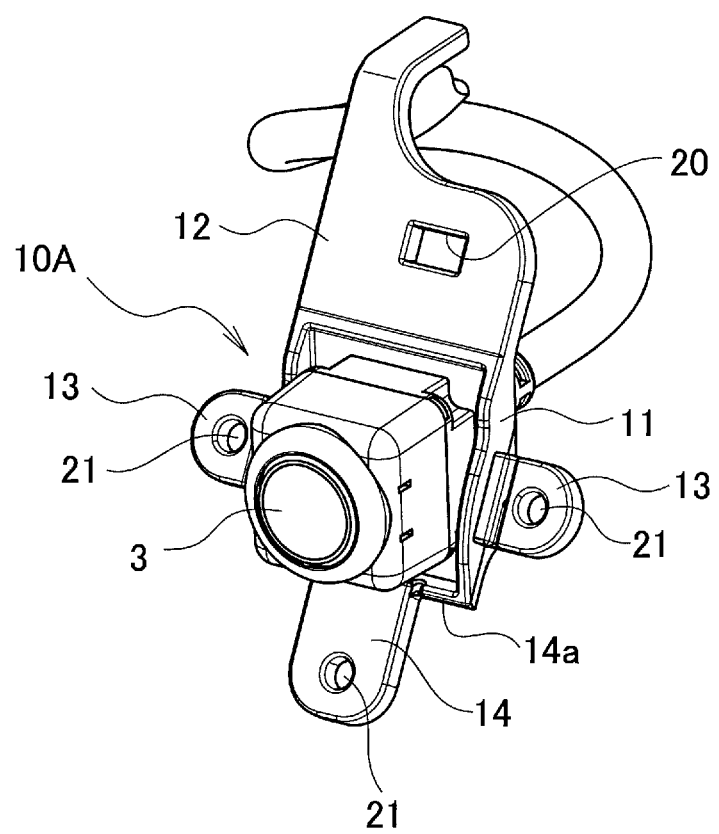
FIG. 2, showing the first embodiment, is a perspective view of a bracket with an on-vehicle camera fixed thereto.
Figure 3:
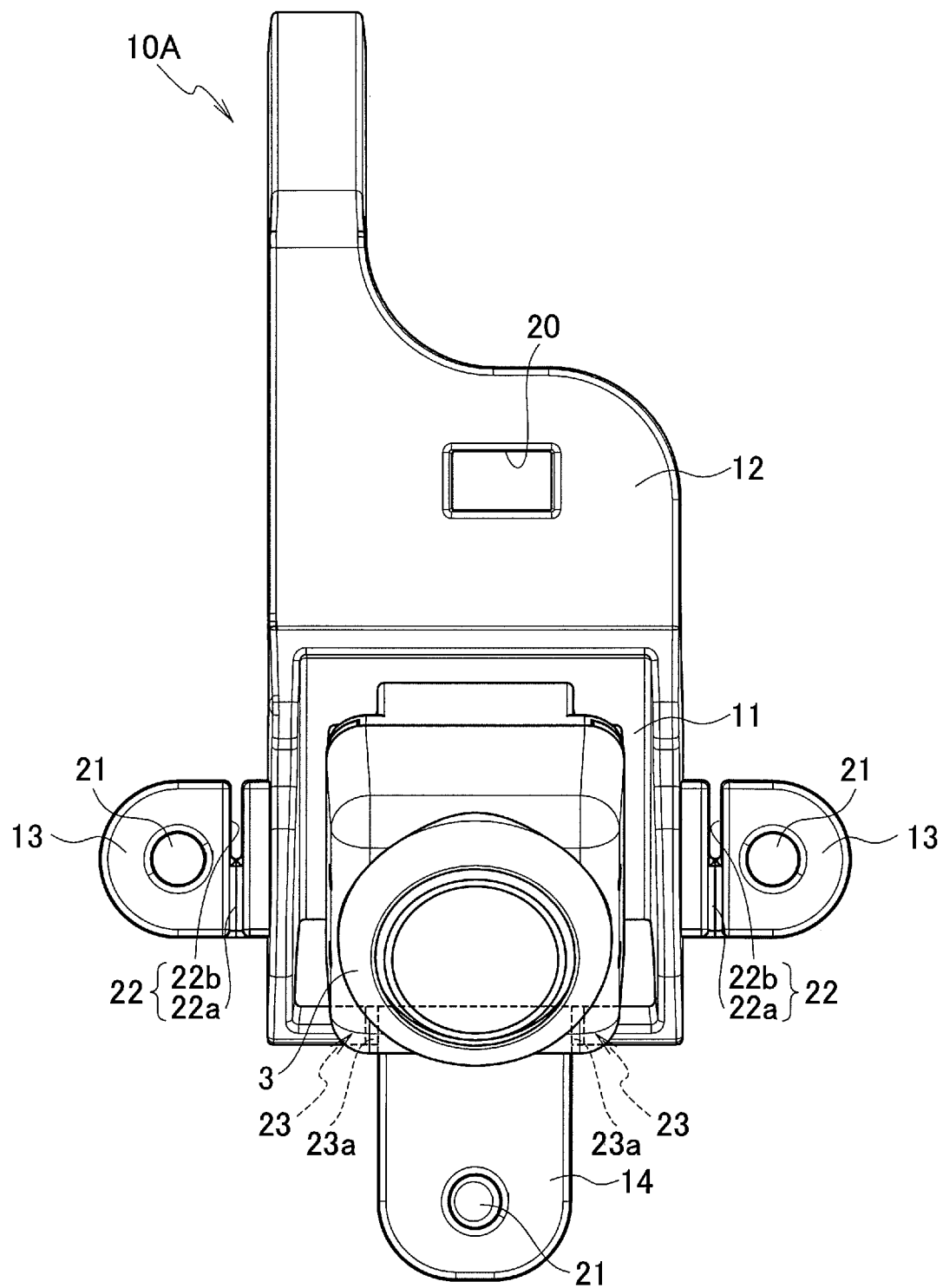
FIG. 3, showing the first embodiment, is a front view of the bracket with the on-vehicle camera fixed thereto.
Figure 4:
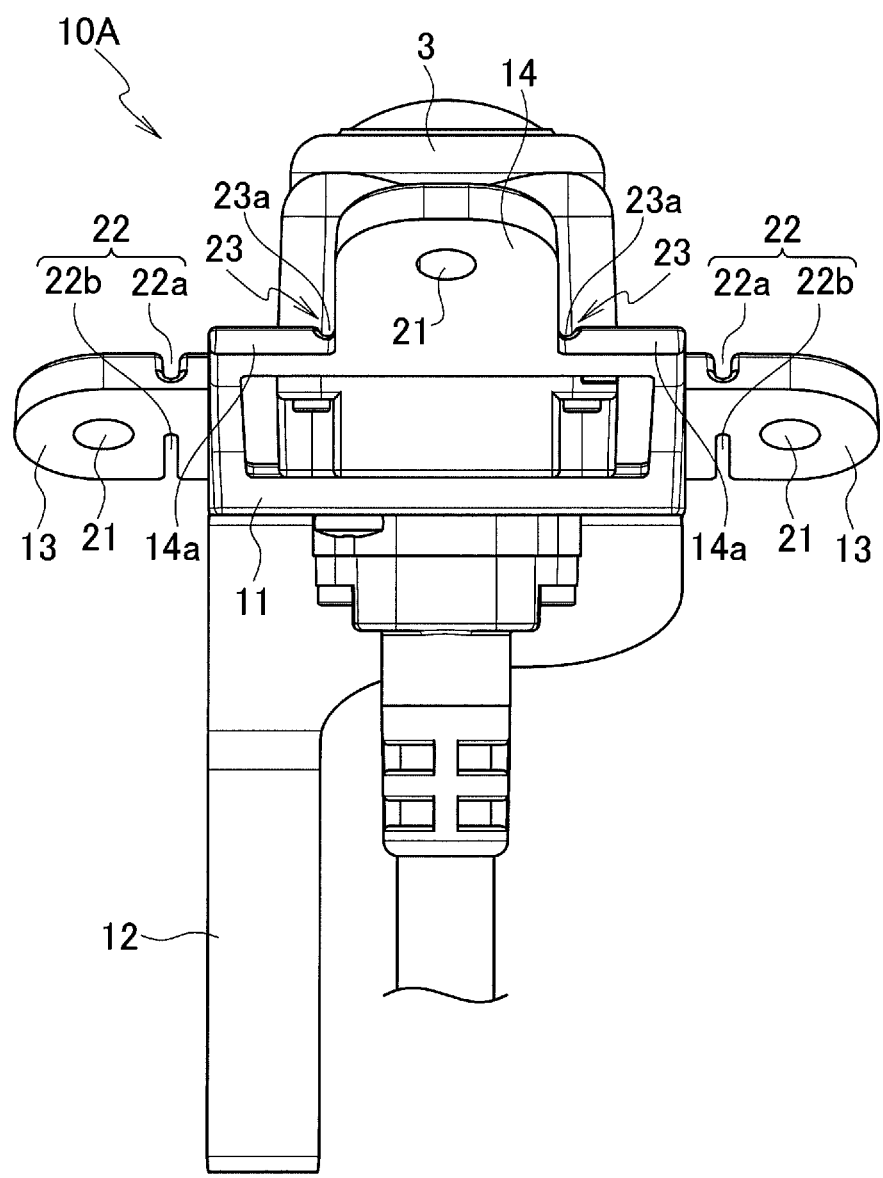
FIG. 4, showing the first embodiment, is a perspective view of the bracket with the on-vehicle camera fixed thereto, as viewed from the back.

As illustrated in FIGS. 2 to 4, the bracket 10A for the on-vehicle camera 3 is made of, for example, resin. The bracket 10A has a camera fixing portion 11, a leg portion 12 provided above the camera fixing portion 11, a pair of first vehicle-mount fixing portions 13 provided on the right and left sides of the camera fixing portion 11, and a second vehicle-mount fixing portion 14 provided below the camera fixing portion 11. In this embodiment, the camera fixing portion 11, the leg portion 12, the pair of first vehicle-mount fixing portions 13, and the second vehicle-mount fixing portion 14 are provided (formed) integrally.

The on-vehicle camera 3 is fixed to the camera fixing portion 11 with a screw.

The leg portion 12 holds electric wiring (not illustrated) connected to the on-vehicle camera 3 with, for example, a crimping member. The leg portion 12 has a positioning hole 20. Into the positioning hole 20 is inserted a positioning pin 5 (illustrated in FIG. 1B) protruding from the back face of the front grille 1.

The pair of first vehicle-mount fixing portions 13 and the second vehicle-mount fixing portion 14 each have a screw insertion hole 21. The pair of first vehicle-mount fixing portions 13 and the second vehicle-mount fixing portion 14 are fixed to the front grille (on the vehicle body side) 1 with screws 6 (illustrated in FIGS. 1B and 1C).

The pair of first vehicle-mount fixing portions 13 have a pair of first weak portions 22 provided at positions at which the camera fixing portion 11 can be separated by breakage. The pair of first weak portions 22 are formed such that they can be broken more easily than the other parts of the first vehicle-mount fixing portions 13. Specifically, each of the first weak portions 22 is formed to be a shape having a cross-sectional area smaller than that of the other part, by having a groove (with a V-shaped cross section, an arc-shaped cross section) 22a formed along the breaking direction at breakage and a slit 22b extending along the breaking direction at breakage.

The second vehicle-mount fixing portion 14 has a frame 14a, via which it is connected to the camera fixing portion 11. The frame 14a of the second vehicle-mount fixing portion 14 has a pair of second weak portions 23 located at positions at which the camera fixing portion 11 can be separated by breakage. The second weak portions 23 are formed such that they can be broken more easily than the other part of the frame 14a of the second vehicle-mount fixing portion 14. Specifically, each of the second weak portions 23 is formed to be a shape having a cross-sectional area smaller than that of the other part of the frame 14a, by having a groove (with a V-shaped cross section, an arc-shaped cross section) 23a formed along the breaking direction at breakage.

Figure 5:
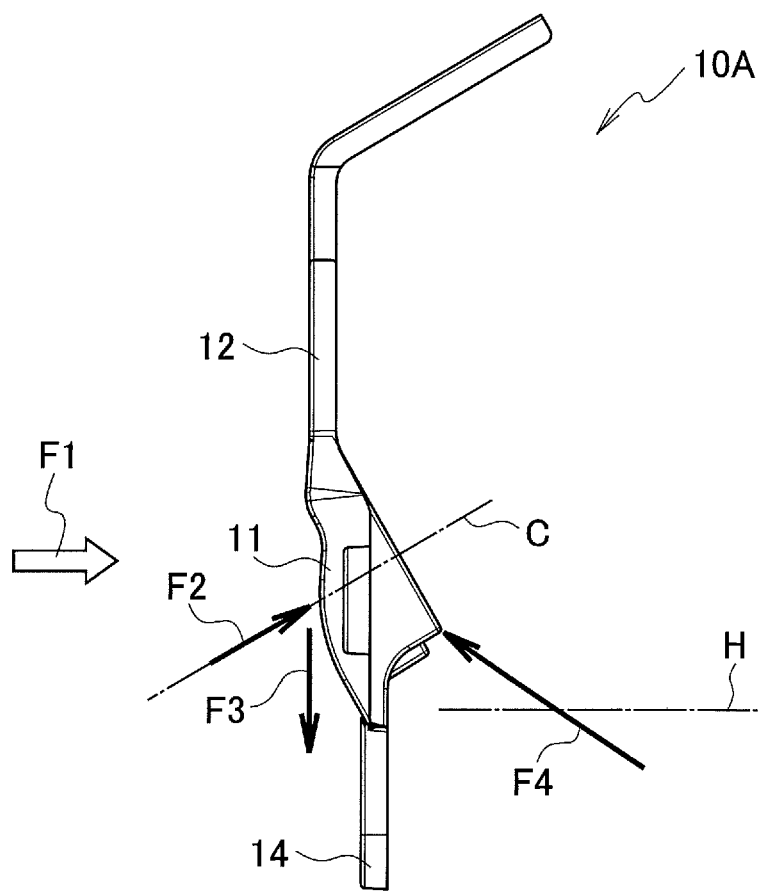
FIG. 5, showing the first embodiment, is a diagram for explaining load conditions of the bracket.

As illustrated in FIG. 5, the pair of first weak portions 22 and the pair of second weak portions 23 are set to have strength that endures force within predetermined external force F2 (for example, a value of force to be exerted when the camera lens is strongly wiped) against external force exerted in camera optical axis direction C. The pair of first weak portions 22 and the pair of second weak portions 23 are set to have strength that endures force within predetermined external force F3 (the value of the sum of the weight of the on-vehicle camera 3 and a load exerted from vehicle vibration) against external force (a load) in the vertical direction.

On the other hand, the pair of first weak portions 22 and the pair of second weak portions 23 are set to have strength with which they are broken when the following external force is exerted. The pair of first weak portions 22 are set to have strength with which they are broken by predetermined external force F1 exerted from the front side of the on-vehicle camera 3 (leg portion 12) in horizontal direction H. On the other hand, the pair of second weak portions 23 are set to have strength that endures predetermined external force F1 exerted from the front side of the on-vehicle camera 3 (leg portion 12) in horizontal direction H. In other words, the magnitudes of the external forces that break the pair of first weak portions 22 and the pair of second weak portions 23 are different. Specifically, against external force exerted from the front side of the on-vehicle camera 3 (leg portion 12) in horizontal direction H, the external force that breaks the pair of first weak portions 22 is set to be low, and that for the pair of second weak portions 23 is set to be high. In addition, the pair of second weak portions 23 are configured to be broken by external force F4 (external force F4 is set to be within the maximum value from the requirement for breakage) exerted by the beam 4 when the camera fixing portion 11 is displaced by the breakage of the pair of first weak portions 22 and hits to the beam 4. Specifically, the pair of second weak portions 23 are set to have strength with which they are broken when pull force (tension) or the like, caused by the effect of external force F4 from the beam 4, is exerted instantaneously on the pair of second weak portions 23.

Next, descriptions will be provided for a case where external force is exerted on the on-vehicle camera 3 (leg portion 12) installed on a vehicle as described above. When an external force is exerted on the on-vehicle camera 3 (leg portion 12) from the front side in horizontal direction H (including a case where the force is exerted in horizontal direction H as a force component), the elastic deformation or the like of the bracket 10A displaces the on-vehicle camera 3 and the camera fixing portion 11 of the bracket 10A toward the back side of the vehicle in the horizontal direction (position 3A in FIG. 6). This movement in horizontal direction H disengages the positioning pin 5 of the front grille 1 from the positioning hole 20 of the leg portion 12, and an external force in horizontal direction H causes shear force or the like exerted on the pair of first weak portions 22, which breaks the pair of first weak portions 22.

Figure 6:
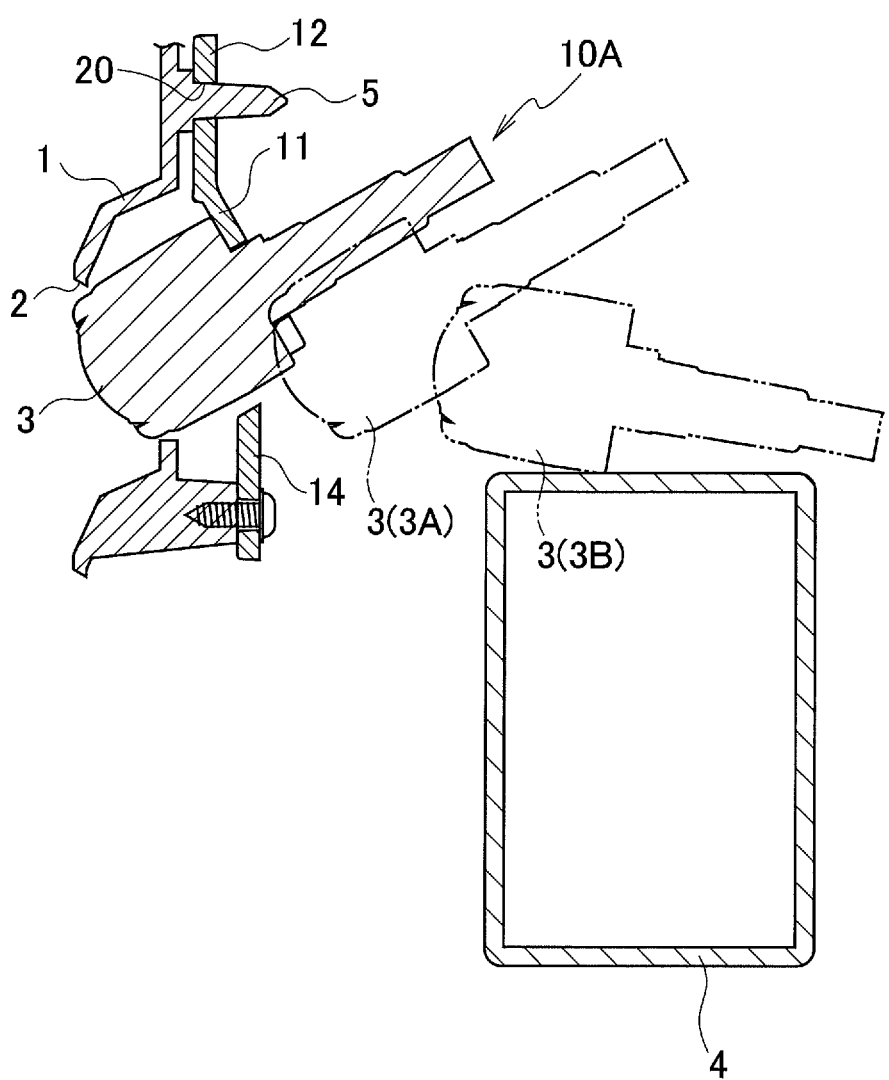
FIG. 6, showing the first embodiment, is a cross-sectional view for explaining the behavior of the on-vehicle camera when it is hit.

When the pair of first weak portions 22 are broken, the bracket 10A swings and is displaced together with the on-vehicle camera 3 so as to be twisted with the second weak portions 23 of the frame 14a of the second vehicle-mount fixing portion 14 as the axis (position 3B in FIG. 6). This swing displacement causes the on-vehicle camera 3 to hit the beam 4, and the on-vehicle camera 3 and the camera fixing portion 11 receive reaction force from the beam 4. The reaction force causes a large pull force or the like, which is exerted on the pair of second weak portions 23 instantaneously and break them. The breakage of the pair of second weak portions 23 causes the integrated piece formed of the on-vehicle camera 3 and the camera fixing portion 11 to come off the vehicle body side (in other words, the first vehicle-mount fixing portions 13 and the second vehicle-mount fixing portion 14).

Hence, there is no possibility of giving a major damage to the hitting object and the portion of the vehicle body where the on-vehicle camera 3 is fixed, and thus, it is possible to protect the hitting object and the portion of the vehicle body where the on-vehicle camera 3 is fixed. In addition, impulsive force is not directly exerted on the on-vehicle camera 3, and thus, it is possible to prevent the on-vehicle camera 3 from receiving a major damage from impulsive force.

The bracket 10A is formed such that the magnitudes of external forces that break the first weak portions 22 and the second weak portions 23 are different. In this embodiment, since the first weak portions 22 are weaker than the second weak portions 23, the first weak portions 22 and the second weak portions 23 are broken in this order when they are broken by impulsive force. For this reason, it is possible to estimate the movement of the on-vehicle camera 3 after impulsive force is exerted thereon, and thus possible to limit the area in which the on-vehicle camera 3, having come off the vehicle body side, moves. By methods such as not installing other parts within the area in which the on-vehicle camera 3 having come off the vehicle body side moves, it is also possible to avoid the on-vehicle camera 3, having come off the vehicle body side, interfering with (hitting) other parts.

As for the bracket 10A, when breakage occurs by impulsive force, the first weak portions 22 and the second weak portions 23 are broken in this order. Thus, it is possible to absorb the impulsive force dispersively, reducing the acceleration exerted on the on-vehicle camera 3 having come off the vehicle body side. With this, even if the on-vehicle camera 3 having come off the vehicle body side interferes with (hits) other parts, the impulsive force would be smaller.

The integrated piece formed of the on-vehicle camera 3 and the camera fixing portion 11, which has come off the vehicle body side, hangs down at the distal end of the electric wiring (not illustrated) and will not completely separate from the vehicle body side. This prevents the on-vehicle camera 3 having come off the vehicle body side, from hitting such as falling on the ground.

Figure 7:
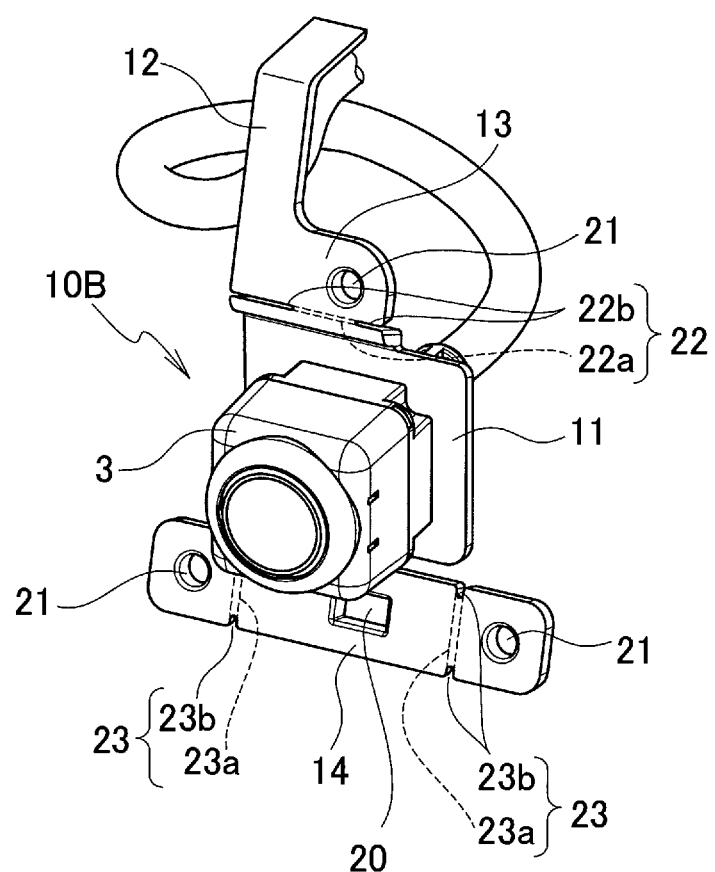
FIG. 7 shows a second embodiment of the present invention and is a perspective view of a bracket with an on-vehicle camera fixed thereto.
Figure 8:
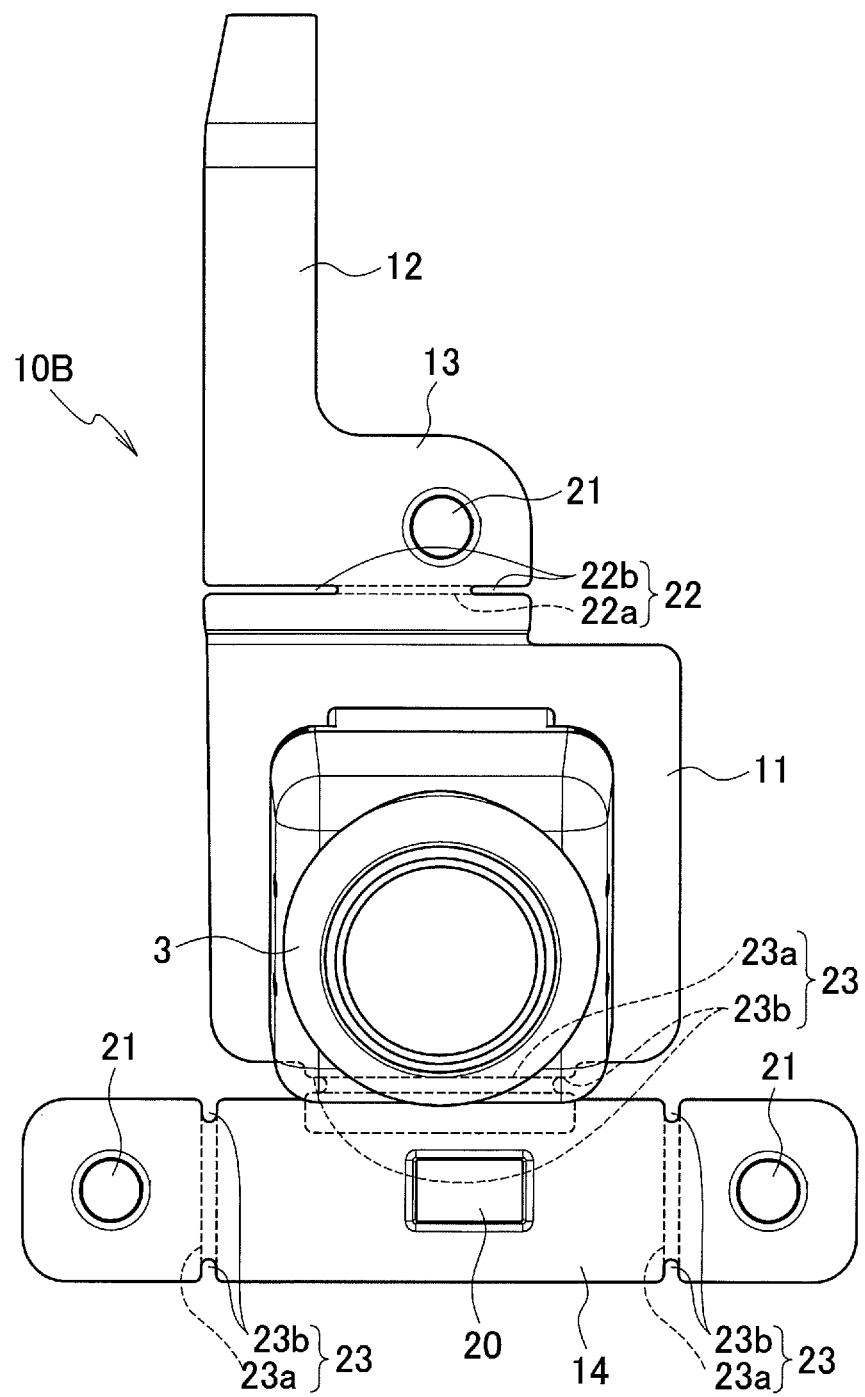
FIG. 8, showing the second embodiment, is a front view of the bracket with the on-vehicle camera fixed thereto.
Figure 9:
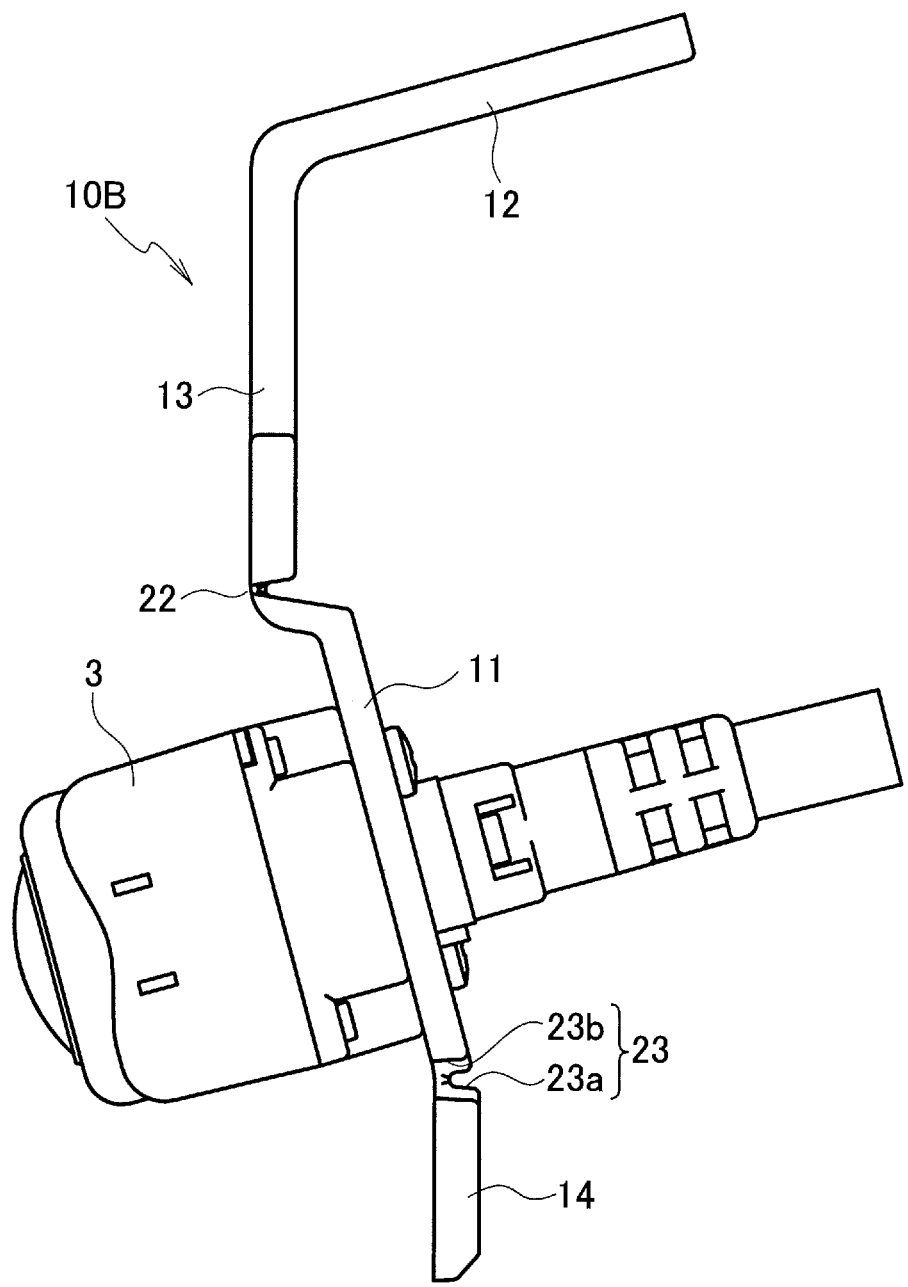
FIG. 9, showing the second embodiment, is a side view of the bracket with the on-vehicle camera fixed thereto.

FIGS. 7 to 9 illustrate a second embodiment of the present invention. The configuration of the second embodiment is the same as that of the first embodiment except for the features described below. In the second embodiment, an on-vehicle camera 3 is fixed via a bracket 10B so as to be seen through the camera installation hole (not illustrated) of the front grille (not illustrated) as in the first embodiment. The bracket 10B for the on-vehicle camera 3 is made of, for example, resin, and has a camera fixing portion 11, a first vehicle-mount fixing portion 13 provided above the camera fixing portion 11, a leg portion 12 provided above the first vehicle-mount fixing portion 13, and a second vehicle-mount fixing portion 14 provided below the camera fixing portion 11. In this embodiment, the camera fixing portion 11, the leg portion 12, the first vehicle-mount fixing portion 13, and the second vehicle-mount fixing portion 14 are provided (formed) integrally.

The first vehicle-mount fixing portion 13 has a screw insertion hole 21. The second vehicle-mount fixing portion 14 has a pair of screw insertion holes 21 at the right and left ends thereof. The first vehicle-mount fixing portion 13 and the second vehicle-mount fixing portion 14 are fixed to the front grille with screws. The second vehicle-mount fixing portion 14 has a positioning hole 20 in the middle thereof. Into the positioning hole 20 is inserted a positioning pin of the vehicle body side.

The first vehicle-mount fixing portion 13 has a first weak portion 22 provided at a position at which the camera fixing portion 11 can be separated by breakage. The first weak portion 22 is formed such that it can be broken more easily than the other part of the first vehicle-mount fixing portion 13. Specifically, the first weak portion 22 is formed to be a shape having a cross-sectional area smaller than that of the other part, by having a groove 22a formed along the breaking direction at breakage and slits 22b extending along the breaking direction at breakage.

The second vehicle-mount fixing portion 14 has second weak portions 23 provided at an upper portion, and right and left positions thereof at which the camera fixing portion 11 can be separated by breakage. Each of the second weak portions 23 is formed such that it can be broken more easily than the other part of the second vehicle-mount fixing portion 14. Specifically, each of the second weak portions 23 is formed to be a shape having a cross-sectional area smaller than that of the other part, by having a groove 23a formed along a breaking direction at breakage and slits 23b extending along the breaking direction at breakage.

The first weak portion 22 and the second weak portions 23 are set to have the same strength relationship as in the first embodiment.

Also in the second embodiment, there is no possibility of giving a major damage to the hitting object and the portion of the vehicle body where the on-vehicle camera 3 is fixed for substantially the same reason as in the first embodiment, and thus, it is possible to protect the hitting object and the portion of the vehicle body where the on-vehicle camera 3 is fixed.

Figure 10:
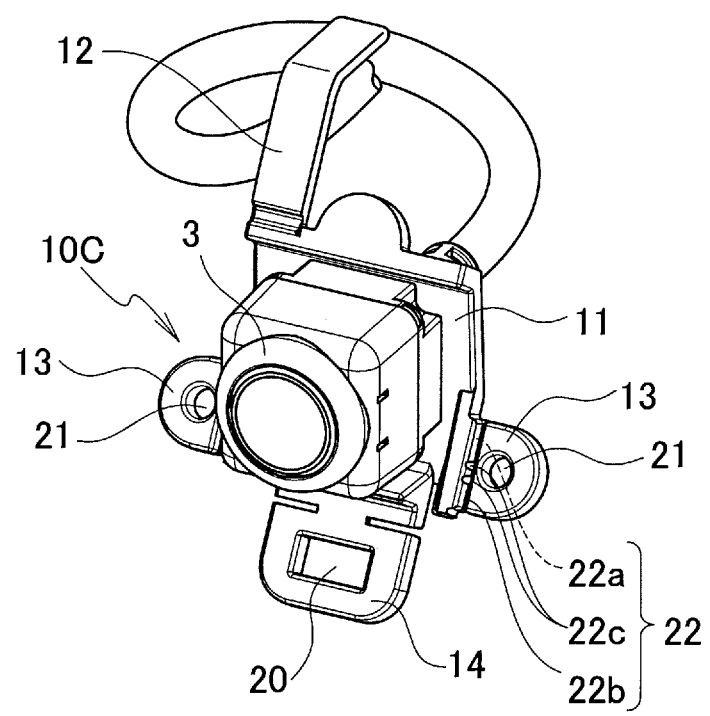
FIG. 10 shows a third embodiment of the present invention and is a perspective view of a bracket with an on-vehicle camera fixed thereto.
Figure 11:
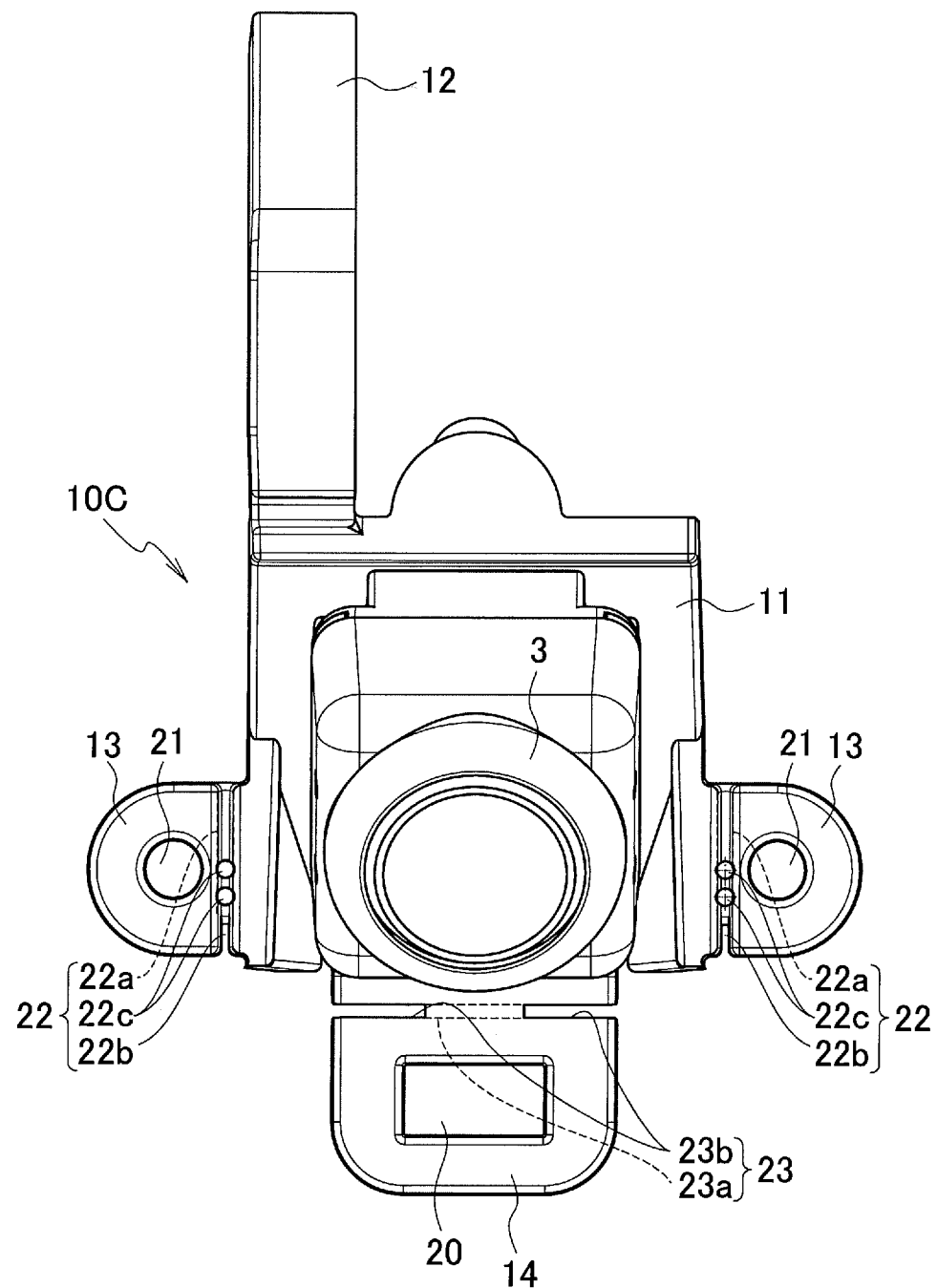
FIG. 11, showing the third embodiment, is a front view of the bracket with the on-vehicle camera fixed thereto.

FIGS. 10 and 11 illustrate a third embodiment of the present invention. The configuration of the third embodiment is the same as that of the first embodiment except for the features described below. In the third embodiment, an on-vehicle camera 3 is fixed via a bracket 10C so as to be seen through the camera installation hole (not illustrated) of the front grille (not illustrated), as in the first embodiment. The bracket 10C for the on-vehicle camera 3 is made of, for example, resin, and has a camera fixing portion 11, a leg portion 12 provided above the camera fixing portion 11, a pair of first vehicle-mount fixing portions 13 provided on the right and left sides of the camera fixing portion 11, and a second vehicle-mount fixing portion 14 provided below the camera fixing portion 11. In this embodiment, the camera fixing portion 11, the leg portion 12, the pair of first vehicle-mount fixing portions 13, and the second vehicle-mount fixing portion 14 are provided (formed) integrally.

The pair of first vehicle-mount fixing portions 13 each have a screw insertion hole 21. The pair of first vehicle-mount fixing portions 13 are fixed to the front grille with screws. The second vehicle-mount fixing portion 14 has a positioning hole 20. Into the positioning hole 20 is inserted a positioning pin of the vehicle body side.

The pair of first vehicle-mount fixing portions 13 have a pair of first weak portions 22 provided at positions at which the camera fixing portion 11 can be separated by breakage. The pair of first weak portions 22 are formed such that they can be broken more easily than the other parts of the first vehicle-mount fixing portions 13. Specifically, each of the first weak portions 22 is formed be a shape having a cross-sectional area smaller than that of the other part, by having a groove 22a formed along the breaking direction at breakage, a slit 22b extending along the breaking direction at breakage, and holes 22c formed at positions along the breaking direction at breakage.

The second vehicle-mount fixing portion 14 has a second weak portion 23 provided at a position at which the camera fixing portion 11 can be separated by breakage. The second weak portion 23 is formed such that it can be broken more easily than the other part of the second vehicle-mount fixing portion 14. Specifically, the second weak portion 23 is formed to be a shape having a cross-sectional area smaller than that of the other part, by having a groove 23a formed along the breaking direction at breakage and slits 23b extending along the breaking direction at breakage.

The pair of first weak portions 22 and the second weak portion 23 are set to have the same strength relationship as in the first embodiment.

Also in the third embodiment, there is no possibility of giving a major damage to the hitting object and the portion of the vehicle body where the on-vehicle camera 3 is fixed for substantially the same reason as in the first embodiment, and thus, it is possible to protect the hitting object and the portion of the vehicle body where the on-vehicle camera 3 is fixed.

In the embodiments described above, the multiple weak portions 22 and 23 are the first weak portion 22 and the second weak portion 23, two in total. The number of weak portions may be three or more. In this case, the weak portion which is broken last only needs to be set to have a strength with which it can be broken by an external force received from a vehicle body structure caused when the integrated piece formed of the on-vehicle camera 3 and the camera fixing portion 11 is displaced by the breakage of another weak portion and hits the vehicle body structure.

In the above embodiments, the first weak portion 22 and the second weak portion 23 have a cross-sectional area smaller than that of the other part by combining at least two of the groove 22a or 23a, the slit 22b or 23b, and the hole 22c. However, the combination is arbitrary, or weak portions may be formed with a single element (only a groove, only a slit, or only a hole).

Although descriptions in the above embodiments have been provided for the case where the bracket 10A, 10B, or 10C for the on-vehicle camera 3 is installed at the camera installation hole 2 (see FIGS. 1A to 1C) of the vehicle front grille 1 (see FIGS. 1A to 1C), the present invention may be applied to cases where a bracket is installed at a different fixing position. In the case where the bracket 10A, 10B, or 10C for the on-vehicle camera 3 is used in conditions different from the above embodiments, it is possible to easily change the prerequisite to breakage by increasing or decreasing the depth of grooves, the proportion of slits, and the number and the size of holes, which constitute a weak portion.

Although descriptions in the above embodiments have been provided for the case where the bracket 10A, 10B, or 10C for the on-vehicle camera 3 is made of resin, used material is not limited to this, but metal or the like may be used.

Although descriptions in the above embodiments have been provided for the case where the bracket 10A, 10B, or 10C of the on-vehicle camera 3 is formed integrally from a single material, the invention is not limited to this as long as a bracket has the breakage characteristic described above. For example, in the bracket 10A for the on-vehicle camera 3, different materials may be used to form the camera fixing portion 11, the leg portion 12, the pair of first vehicle-mount fixing portions 13, the second vehicle-mount fixing portion 14, the pair of first weak portions 22, and the pair of second weak portions 23. The same configuration may be applied to the brackets 10B and 10C for the on-vehicle camera 3.

Although the on-vehicle camera 3 in the above embodiments are for capturing images of the periphery of the vehicle, the location of the image target is not limited. Although the on-vehicle camera 3 in the above embodiments is installed at a position where the on-vehicle camera 3 is exposed outward of the vehicle, the installation location is also not limited.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A bracket for an on-vehicle camera comprising:
   a camera fixing portion to which the on-vehicle camera is fixed;
   first and second vehicle mount fixing portions provided integrally with the camera fixing portion and configured to be fixed to a vehicle body; and
   a first weak portion disposed between the camera fixing portion and the first vehicle mount fixing portion and a second weak portion disposed between the camera fixing portion and the second vehicle mount fixing portion such that the camera fixing portion is separable from the first and second vehicle-mount fixing portions by breakage of the first and second weak portions due to an external force exerted on the camera fixing portion when the bracket is mounted to the vehicle, the first and second weak portions being breakable more easily than another part of the bracket, wherein
   magnitudes of external forces for breaking the first and second weak portions are different from one another,
   one of the first and second weak portions is broken last and another of the first and second weak portions is broken first, and
   the last breaking weak portion has a strength such that the last breaking weak portion is broken by an external force received from a vehicle body structure when an integrated piece hits against the vehicle body structure, the integrated piece being formed of the on-vehicle camera and the camera fixing portion displaced by breakage of the first broken weak portion.

2. The bracket for an on-vehicle camera according to claim 1, wherein
   the last breaking weak portion has a strength such that the last breaking weak portion is broken by an instantaneous pull force generated by the external force received from the vehicle body structure when the integrated piece hits against the vehicle body structure.

3. The bracket for an on-vehicle camera according to claim 1, wherein
   the first weak portion is configured to be broken earlier than the second weak portion by an external force received from a front side of the on-vehicle camera in a horizontal direction, and
   the second weak portion has a strength such that the second weak portion is broken by an instantaneous pull force generated by an external force received by a vehicle body structure at a time of a hit of an integrated piece against the vehicle body structure, the integrated piece being formed of the on-vehicle camera and the camera fixing portion displaced by breakage of the first weak portion.

4. The bracket for an on-vehicle camera according to claim 1, wherein the first weak portion has a groove extending along a breaking direction at the breakage and has a cross-sectional area smaller than each of cross-sectional areas of the camera fixing portion and the first vehicle-mount fixing portion.

5. The bracket for an on-vehicle camera according to claim 1, wherein the first weak portion has a slit extending along a breaking direction at the breakage and has a cross-sectional area smaller than each of cross-sectional areas of the camera fixing portion and the first vehicle-mount fixing portion.

6. The bracket for an on-vehicle camera according to claim 1, wherein the first weak portion has a hole located at a position along a breaking direction at the breakage and has a cross-sectional area smaller than each of cross-sectional areas of the camera fixing portion and the first vehicle-mount fixing portion.

7. The bracket for an on-vehicle camera according to claim 1, wherein the on-vehicle camera is fixed to the camera fixing portion with a screw.

8. A bracket for an on-vehicle camera comprising:
   the on-vehicle camera;
   a camera fixing portion to which the on-vehicle camera is fixed;
   first and second vehicle mount fixing portions provided integrally with the camera fixing portion and configured to be fixed to a vehicle body; and
   a first weak portion disposed between the camera fixing portion and the first vehicle mount fixing portion and a second weak portion disposed between the camera fixing portion and the second vehicle mount fixing portion such that the camera fixing portion is separable from the first and second vehicle-mount fixing portions by breakage of the first and second weak portions due to an external force exerted on the camera fixing portion when the bracket is mounted to the vehicle, the first and second weak portions being breakable more easily than an other part of the bracket, wherein
   magnitudes of external forces for breaking the first and second weak portions are different from one another,
   one of the first and second weak portions is broken last and another of the first and second weak portions is broken first, and
   the last breaking weak portion has a strength such that the last breaking weak portion is broken by an external force received from a vehicle body structure when an integrated piece hits against the vehicle body structure, the integrated piece being formed of the on-vehicle camera and the camera fixing portion displaced by breakage of the first broken weak portion.

* * * * *